United States Patent
Glenn et al.

(10) Patent No.: US 10,534,012 B2
(45) Date of Patent: *Jan. 14, 2020

(54) BIDIRECTIONAL FLOW SWITCH

(71) Applicant: Gems Sensors Inc., Plainville, CT (US)

(72) Inventors: Brian J. Glenn, Burlington, CT (US); Nathan H. Kulak, Farmington, CT (US)

(73) Assignee: Gems Sensors Inc., Plainville, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/475,090

(22) Filed: Mar. 30, 2017

(65) Prior Publication Data

US 2017/0284843 A1    Oct. 5, 2017

Related U.S. Application Data

(60) Provisional application No. 62/315,054, filed on Mar. 30, 2016.

(51) Int. Cl.
*G01F 1/56* (2006.01)
*G01P 13/00* (2006.01)

(52) U.S. Cl.
CPC .................................. *G01P 13/00* (2013.01)

(58) Field of Classification Search
None
See application file for complete search history.

(56) References Cited

U.S. PATENT DOCUMENTS

| | | | | |
|---|---|---|---|---|
| 4,996,396 A | * | 2/1991 | Smith | H01H 35/405 |
| | | | | 200/81.9 M |
| 5,070,220 A | * | 12/1991 | Glenn | F16L 55/10 |
| | | | | 200/81.9 M |
| 5,416,294 A | * | 5/1995 | Glenn | H01H 35/405 |
| | | | | 200/81.9 M |
| 5,621,398 A | | 4/1997 | Blair et al. | |
| 6,472,624 B1 | * | 10/2002 | Harris | H01H 35/405 |
| | | | | 200/81.9 M |
| D606,165 S | * | 12/2009 | Kurisaki | D23/233 |

(Continued)

FOREIGN PATENT DOCUMENTS

| AU | 2015261923 | 12/2015 |
|---|---|---|
| JP | 5663480 | 2/2015 |
| WO | WO2010031162 | 3/2010 |

OTHER PUBLICATIONS

Office Action dated Oct. 5, 2018, for co-pending U.S. Appl. No. 15/475,081.

(Continued)

*Primary Examiner* — Natalie Huls
*Assistant Examiner* — Mohammed E Keramet-Amircolai
(74) *Attorney, Agent, or Firm* — Nelson Mullins Riley & Scarborough LLP

(57) ABSTRACT

A bidirectional flow switch includes a housing having a flow passage therethrough. A body is disposed moveably in the flow passage and biased towards a first position at zero flow. A magnetic sensor is proximate the housing. A magnet is disposed with respect to the body and the magnetic sensor so that when the body is at the first position, the magnetic sensor is at a first state and so that the magnetic sensor is at a second state when a flow rate through the flow passage is greater than a threshold flow rate that moves the body from the first position.

15 Claims, 3 Drawing Sheets

(56) References Cited

U.S. PATENT DOCUMENTS

| | | | |
|---|---|---|---|
| 8,264,361 B2* | 9/2012 | Struyk | G01P 13/002 340/603 |
| 8,882,054 B1* | 11/2014 | Maki | F16L 3/22 211/70.4 |
| 8,978,750 B2 | 3/2015 | Noske et al. | |
| 2002/0020460 A1 | 2/2002 | Viken | |
| 2006/0141912 A1* | 6/2006 | Valentini | B24B 23/026 451/101 |
| 2007/0083921 A1* | 4/2007 | Parris | A45C 5/14 726/9 |
| 2008/0094107 A1 | 4/2008 | Dallaire et al. | |
| 2010/0253019 A1* | 10/2010 | Ogawa | B60G 21/0553 280/5.511 |
| 2015/0204701 A1 | 7/2015 | Klicpera | |
| 2015/0211332 A1 | 7/2015 | Noske et al. | |
| 2016/0076909 A1 | 3/2016 | Klicpera | |
| 2017/0284842 A1* | 10/2017 | Glenn | G01P 13/00 |
| 2017/0284843 A1* | 10/2017 | Glenn | G01P 13/00 |

OTHER PUBLICATIONS

Prototype Photo 1.
Prototype Photo 2.

\* cited by examiner

BIDIRECTIONAL FLOW SWITCH

CROSS REFERENCE TO RELATED APPLICATION

The present application claims priority to U.S. provisional patent application Ser. No. 62/315,054, filed Mar. 30, 2016, entitled SYSTEM AND METHOD FOR IMPROVED BI-DIRECTIONAL FLOW SWITCH, the entire disclosure of which is hereby incorporated by reference herein.

FIELD OF THE INVENTION

The present invention relates generally to switches and, more particularly, to a flow switch for detecting bi-directional fluid or gas flow.

BACKGROUND OF THE INVENTION

Equipment manufacturers engaged in the production of flow switches for fluid or gas sensing have various technologies available to them in the design of sensing elements to accommodate a variety of flow rate sensing hardware. Most customers seeking a simple solution to threshold sensing specify sensors to communicate that flow has risen above, or fallen below, a specific setpoint in an application. Typically, for these types of applications, the need is for a switch that is capable of sensing flow in only one direction. Routinely the need is served well by simple switch designs available in a variety of sizes and configurations.

When there is a need to sense flow in both forward and reverse directions in a process, the choices become limited, and manufactures may opt to serve the need by choosing a more complicated, continuous sensing device. Many of these types of sensors have the ability of sensing bidirectional flow by employing the use of electronic circuitry that is capable of processing signals from mechanical or electronic components in the flow stream. Unfortunately, although these technologies may be effective, they are typically more expensive due to their complex nature. In addition, they can be more susceptible to the effects of unintended external electrical interference than the simpler, electronic solution, typically found in a one directional flow switch.

In certain bidirectional flow switches, sometimes referred to as paddle switches, a generally planar paddle extends into a flow path, where the plane of the paddle is oriented perpendicularly to the flow path's general flow direction under zero flow conditions. The planar paddle is hinged at an end so that flow through the flow path impinges upon the paddle and causes it to pivot about the hinge's axis. As the paddle pivots about the hinge from its perpendicular, zero-flow position, a mechanical linkage from the paddle pulls a magnet, which is spring biased away from a reed switch, towards the reed switch. A threshold flow causes the magnet to travel to a position proximate the reed switch so that the reed switch changes from an open state to a closed state. Alternatively, continuous sensing devices, such as, for example, paddle wheel meters or ultrasonic meters, may be more complex and expensive than simple one-direction flow switches. In a paddle wheel switch, a cylindrical wheel has flanges and magnets disposed in a spaced apart manner about its cylindrical outer surface. A portion of this surface extends into the flow path so that fluid flow engages the paddles and correspondingly turns the wheel. The remaining portion of the wheel extends outside the flow path, at which magnetically-sensitive electronics detect movement of the rotating magnets. Such arrangements can be susceptible to damage in response to high flow rates and can require relatively sophisticated circuitry to respond to frequency of magnet movement.

SUMMARY OF THE INVENTION

In an embodiment, a bidirectional flow switch has a housing that defines a first port, a second port, and a flow passage between the first port and the second port so that the flow passage defines a first flow direction from the first port to the second port and a second flow direction from the second port to the first port. A magnetic sensor is proximate the housing. A body is disposed movably within the flow passage. An elastic member is disposed between the housing and the body so that the elastic member biases the body to a first position when no fluid flows through the passage. A magnet is attached to the body so that the magnet is movable with the body in the passage in the first flow direction and in the second flow direction, in response to flow of fluid in the passage in the first flow direction and flow of fluid in the passage in the second flow direction, respectively. The magnet is disposed with respect to the body, and the body and the magnetic sensor are disposed with respect to the flow passage, so that at the first position of the body, the magnet and the magnetic sensor are disposed with respect to each other so that the magnetic sensor is in a first state, and upon a predetermined rate of flow of fluid in the first flow direction, the body moves within the passage from the first position so that the magnet moves in the first flow direction, causing relative movement between the magnet and the magnetic sensor that causes the magnetic sensor to change state from the first state, and, upon a predetermined rate of flow of fluid in the second flow direction, the body moves within the passage from the first position so that the magnet moves in the second flow direction, causing relative movement between the magnet and the magnetic sensor that causes the at least one magnetic sensor to change state from the first state.

In a further embodiment, a bidirectional flow switch has a housing defining a flow passage that is elongated in a first direction, a magnetic sensor in a fixed position with respect to the flow passage, and a body that is disposed in the flow passage and that is movable with respect to the housing. A magnet is in a fixed position with respect to the body so that a movement of the body causes a movement of the magnet, wherein the movement of the magnet has a directional component in the first direction. An elastic member biases the body towards a first position within the flow passage. The body and the housing are configured so that a first threshold flow rate through the flow body in the first direction causes the magnet to move past a first displacement distance in the first direction, and a second threshold flow rate through the body in a second direction that is opposite the first direction causes the magnet to move past a second displacement distance in the second direction. The magnetic sensor is in a first state when the body is in the first position, and the magnetic sensor is in a second state that is different from the first state when the body is displaced past at least one of the first displacement distance in the first direction and the second displacement direction in the second direction.

In a still further embodiment, a bidirectional flow switch has a housing defining a generally cylindrical flow passage between a first port and a second port so that the flow passage defines a first flow direction from the first port to the second port and a second flow direction from the second port to the first port. A body is movable with respect to the housing in the first flow direction and in the second flow direction, wherein the body includes a solid portion across its interior so that fluid received by a respective end of the body from the first port or the second port flows about the solid portion and between an outer surface of the solid portion and an inner surface of the flow passage. A stepped down section within the cylindrical flow passage has a diameter smaller than a diameter of the flow passage on both sides of the stepped down section. A magnetic sensor is attached to the housing. A magnet is attached to the body. A pair of springs bias the body towards a first position in which the magnet is aligned with the magnetic sensor and the stepped down section in a direction transverse with the first direction. When the body is in the first position, a distance is defined between the stepped down section and an exterior of the body so that a first threshold flow rate through the housing in the first direction causes the magnet to move past a first displacement distance in the first direction, and a second threshold flow rate through the housing in the second direction causes the magnet to move past a second displacement distance in the second direction. The magnetic sensor is in a first state when the body is in the first position. The magnetic sensor is in a second state that is different from the first state when the body is displaced past at least one of the first displacement distance in the first direction and the second displacement direction in the second direction.

Further areas of applicability of the present invention will become apparent from the detailed description provided hereinafter. It should be understood that the detailed description and specific examples, while indicating one or more embodiments of the invention, are intended for purposes of illustration only and are not intended to limit the scope of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1:
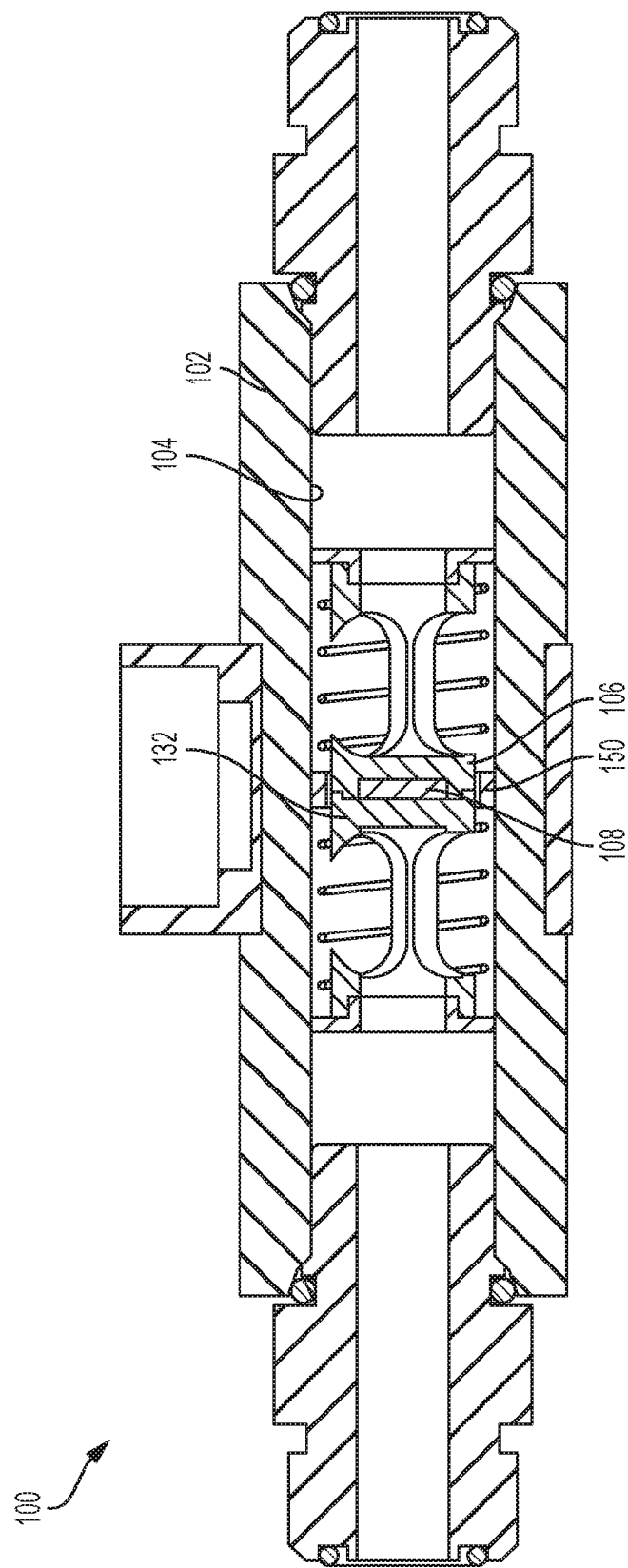
FIG. 1 is a cross sectional view of an bidirectional flow switch according to an example embodiment.

Repeat use of reference characters in the present specification and drawings is intended to represent same or analogous features or elements of the invention according to the disclosure.

DESCRIPTION OF THE PREFERRED EMBODIMENTS

Some example embodiments now will be described more fully hereinafter with reference to the accompanying drawings, in which some, but not all example embodiments are shown. Indeed, the examples described and pictured herein should not be construed as being limiting as to the scope, applicability, or configuration of the present disclosure. Like reference numerals refer to like elements throughout. As used herein, "operable coupling" should be understood to refer to direct or indirect connection that, in either case, enables functional interconnection of components that are operably coupled to each other.

As used herein, terms referring to a direction or a position relative to the orientation of a bidirectional flow switch, such as but not limited to "vertical," "horizontal," "above," or "below," refer to directions and relative positions with respect to the flow switch's orientation in its normal intended operation, as indicated in FIG. 1.

Further, the term "or" as used in this disclosure and the appended claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provided illustrative examples for the terms. The meaning of "a," "an," and "the" may include plural references, and the meaning of "in" may include "in" and "on." The phrase "in one embodiment," as used herein does not necessarily refer to the same embodiment, although it may.

In order to provide an improved bi-directional flow switch design and to overcome the disadvantages and problems of currently available devices, there is provided a switch having a straight through flow body that is configured to be plumbed directly into a customer's process lines. A particular advantage of the new and novel system described herein is the reduced cost of detecting bi-directional flow of fluids and gases. Another advantage is the reduced risk of electric interference relative to electronic based bi-directional switches.

Referring to FIG. 1, the presently described innovative bi-directional switch 100 includes a flow body 102 that houses a piston 106 that is translated by fluid flow within a stepped metering bore 150 in flow body 102. Piston 106 is designed to respond equally to fluid flow in either direction and to minimize the development of pressure drop as process flows ramp to higher rates above the sensed setpoint. In a particular configuration, sensor 100 provides a primary output at a "no-flow" condition, and a secondary output when flow has moved above a prescribed setpoint, regardless of flow direction. In order to provide an output, piston 106 holds a permanent magnet 108, allowing it to communicate with a magnetically operated reed switch housed outside a flow stream 104 in flow body 102. Although sensor output via a magnetically actuated reed switch is desirable, it should be understood that alternative magnetically actuated electronic component, such as a Hall Effect or related device, may also be used.

An advantage of the improved system and method is that the design is flexible enough to provide for variety of circuit conditions, depending on a specific application's needs. The sensor is configured in a normally closed condition for use in applications where knowledge of the actual direction of flow may not be essential, but rather, only that flow above a certain threshold is present in either direction. In this case, flow rising above the calibrated setpoint in either direction allows the switch to open and indicate that flow is present. In alternate configurations, piston 106 is translated to trip multiple reed switches, to not only indicate that fluid flow has been achieved, but to also indicate the particular direction that fluid is moving in the process.

It should be understood that the geometry lends itself to easy machining of components from metal materials of construction, which may be valuable in meeting the needs of higher pressure applications such as hydraulic systems, for example. However, the need for lower cost variants in lower pressure OEM type applications may be better severed in some instances with a machined or molded plastic version of the device, and the components lend themselves to that method of fabrication. It is envisioned that in the case of a forged, or cast metal version, or of a plastic molded flow body, the provision to receive the reed switch assembly could be provided as an integral part of flow body itself 102, eliminating the need for the added sub-housing shown herein to house the reed switch.

It can be seen that piston 106 is constructed with a center section 132 comprised of an outside diameter that is designed with an internal cavity to receive permanent magnet 108. The outside diameter at center region 132 of piston 106 acts as a metering region and is associated with stepped down, metering bore 150 in the center of flow body 102. It should be noted that while center metering region 132 on piston 106 is shown as a diameter which is continuous, with the diameters containing the axially slotted bypass geometry on either side of it, it may be produced with a different diameter, as necessary, to produce an appropriate flow restriction, and thus the set point required in a particular application. It therefore follows that the dimensional relationship between these two cylindrical elements, i.e. the stepped down area 150 in flow body 102 and center diameter 132 of piston 106, is calibrated, as required, to accommodate various switch set points.

Figure 2:
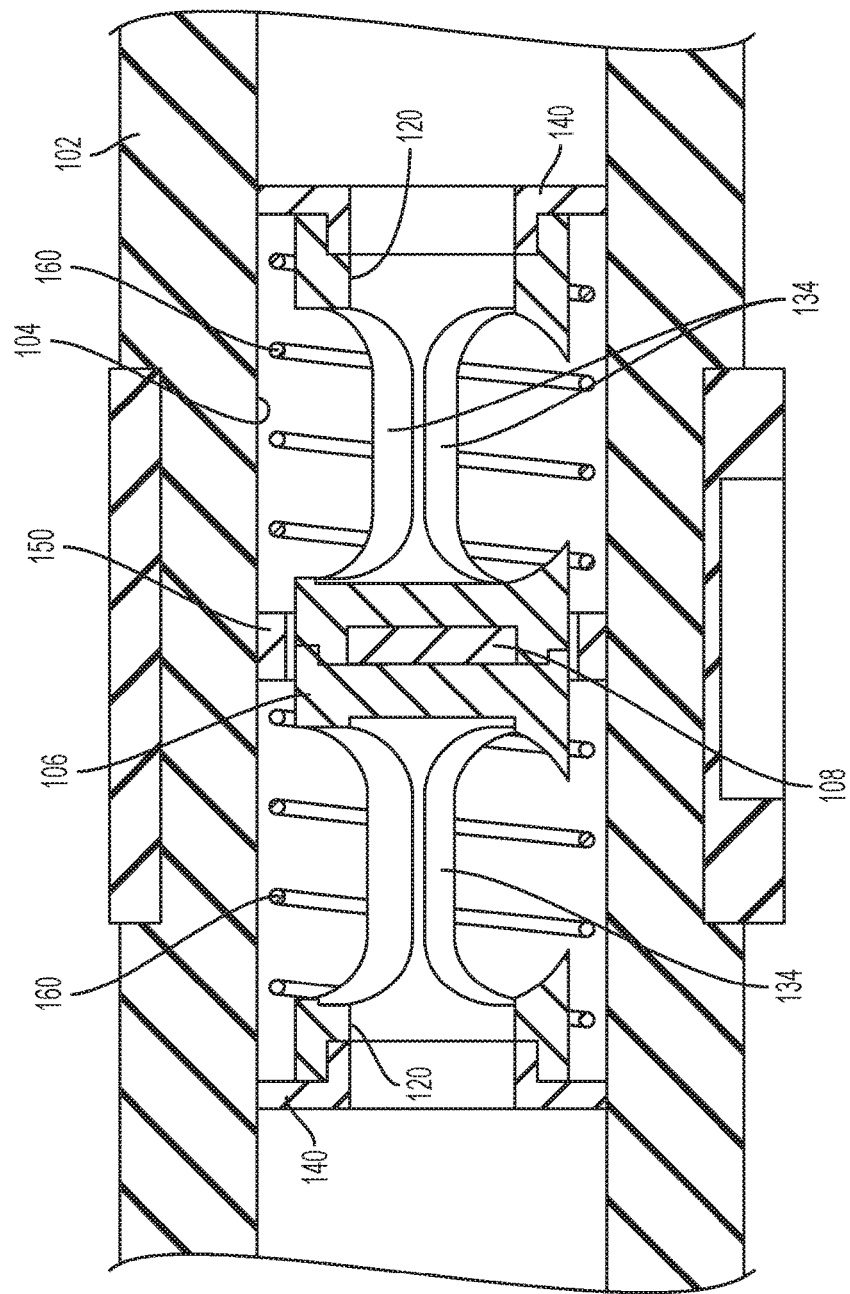
FIG. 2 is a partial cross sectional view of the bidirectional flow switch of FIG. 1.

Turning now to FIG. 2, the piston is shown outfitted with flanges 140 on each end that are assembled to lock a set of opposing compression springs 160 to the stepped down area 150 at the center of flow body 102. This assembled relationship causes the center of piston 106 to bias to the center of flow body 102 and align permanent magnet 108 to a center housed reed switch at a no-flow condition. Flanged ends 140 of piston 106 further act as guides to allow concentric travel of the piston within the flow body bypass bore 104. These flanged components can be adjusted via various means to create a dimensional equilibrium between the opposing springs as necessary. The upstream and downstream ends of piston 106 are characterized by slots 134 placed at angular intervals around the axis of the piston, which communicate with a pair of blind bores 120 on opposite ends of piston 106. These slots 134 and bores 120 act as bypass features for fluid passage under flow conditions.

Figure 3:
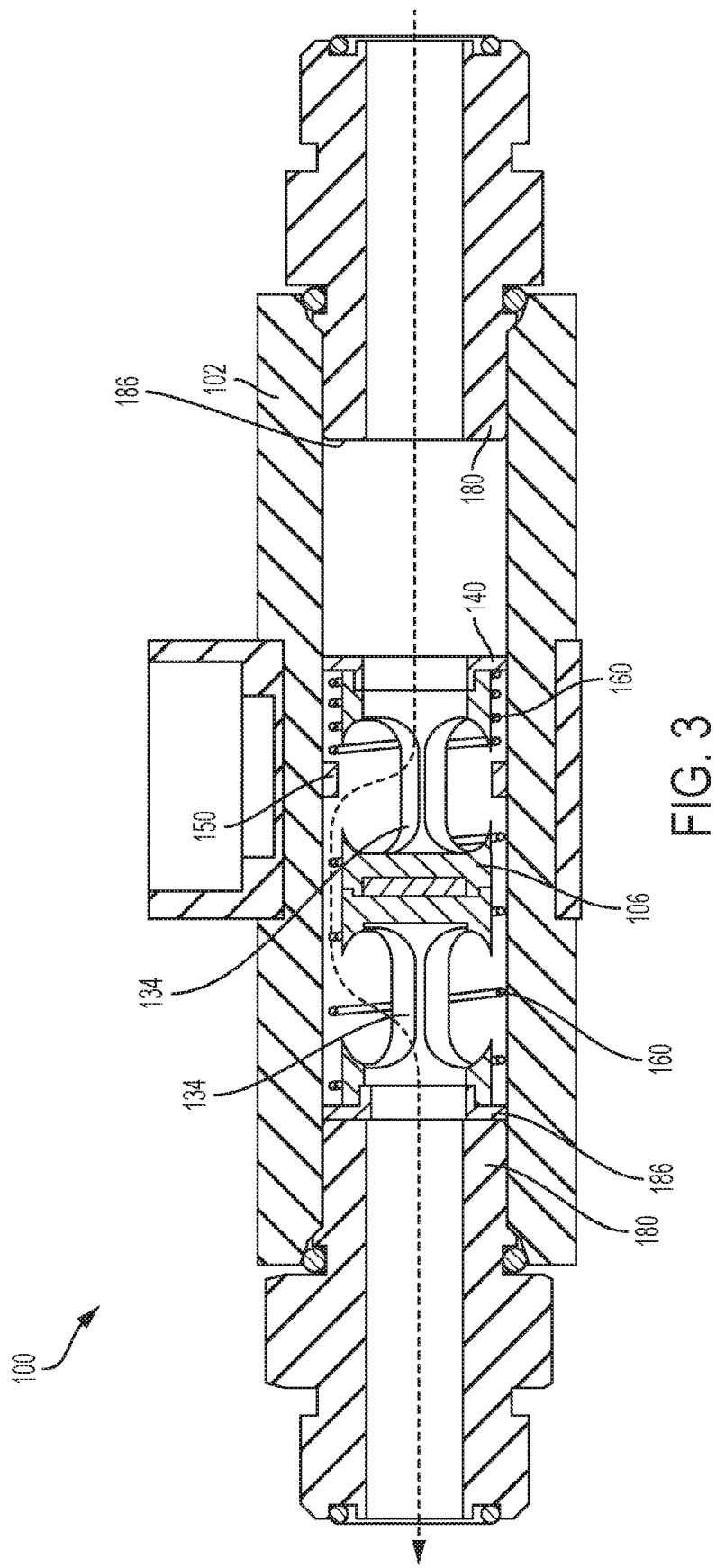
FIG. 3 is a cross sectional view of the bidirectional flow switch of FIG. 1 when fluid is passing therethrough.

FIG. 3 illustrates the present novel device in operation. As fluid velocity begins to rise under media flow through the sensor, a pressure differential develops across the device. The piston responds to the differential by translating against the downstream compression spring 160 in the direction of flow. As piston displacement progresses, axial slots 134 on the upstream side of piston 106 begin to pass through the stepped down metering bore diameter 150 in flow body 102. Once slots 134 are exposed on the downstream side of stepped down diameter 150 in flow body 102, the differential pressure builds at a lower slope relative to flow. Pressure drop across the unit is thus minimized as flow increases across switch 100. The functional response of the piston is the same in keeping with direction of fluid flow.

At full flow, the piston is limited in displacement by end flanges 140, which will come to rest against upstream and downstream stops 186 in flow body 120. Their location is designed to take advantage of best pressure drop relationship of components. The piston stops 186 may be provided as part of end fitting componentry 180 or retaining hardware.

Many modifications and other embodiments of the bidirectional flow sensor set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A bidirectional flow switch, comprising:
a housing that defines a first port, a second port, and a flow passage between the first port and the second port so that the flow passage defines a first flow direction from the first port to the second port and a second flow direction from the second port to the first port;
a magnetic sensor proximate the housing;
a body disposed movably within the flow passage;
an elastic member disposed between the housing and the body so that the elastic member biases the body to a first position when no fluid flows through the flow passage;
a magnet attached to the body so that the magnet is movable with the body in the flow passage in the first flow direction and in the second flow direction, in response to flow of fluid in the flow passage in the first flow direction and flow of fluid in the flow passage in the second flow direction, respectively,
wherein the magnet is disposed with respect to the body, and wherein the body and the magnetic sensor are disposed with respect to the flow passage, so that
at the first position of the body, the magnet and the magnetic sensor are disposed with respect to each other so that the magnetic sensor is in a first state,
upon a predetermined rate of flow of fluid in the first flow direction, the body moves within the flow passage from the first position so that the magnet moves in the first flow direction, causing relative movement between the magnet and the magnetic sensor that causes the magnetic sensor to change state from the first state, and
upon a predetermined rate of flow of fluid in the second flow direction, the body moves within the flow passage from the first position so that the magnet moves in the second flow direction, causing relative movement between the magnet and the magnetic sensor that causes the magnetic sensor to change state from the first state.

2. The bidirectional flow switch as in claim 1, wherein the body comprises a housing and wherein the magnet is attached to the housing of the body.

3. The bidirectional flow switch as in claim 1, wherein when the magnetic sensor is a single magnetic sensor, and the magnet is a single magnet.

4. The bidirectional flow switch as in claim 3, wherein the body is at the first position, the single magnet is aligned with the single magnetic sensor radially with respect to flow of fluid through the flow passage.

5. The bidirectional flow switch as in claim 4, wherein
upon a predetermined rate of flow of fluid in the first flow direction, the body moves within the flow passage from the first position so that the single magnet moves in the first flow direction, causing relative movement between the single magnet and the single magnetic sensor that causes the single magnetic sensor to change state from the first state to a second state, and
upon a predetermined rate of flow of fluid in the second flow direction, the body moves within the flow passage from the first position so that the single magnet moves in the second flow direction, causing relative movement between the single magnet and the single magnetic sensor that causes the single magnetic sensor to change state from the first state to the second state.

6. The bidirectional flow switch as in claim 5, wherein
an outer surface of the body and an inner surface of the housing that defines the flow passage define a minimum cross sectional area therebetween transverse to direction of flow of fluid both in the first flow direction and the second flow direction,
the body and the housing are configured with respect to each other so that, when the body is at the first position, an entirety of flow of fluid in the passage flows through the minimum cross sectional area,
the outer surface of the body and the inner surface of the housing are configured with respect to each other so that, at a relative position between the body and the housing resulting from a rate of flow of fluid in the first flow direction at or greater than the predetermined rate of flow of fluid in the first flow direction, the minimum cross sectional area is greater than the minimum cross sectional area when the body is in the first position, and
the outer surface of the body and the inner surface of the housing are configured with respect to each other so that, at a relative position between the body and the housing resulting from a rate of flow of fluid in the second flow direction at or greater than the predetermined rate of flow of fluid in the second flow direction, the minimum cross sectional area is greater than the minimum cross sectional area when the body is in the first position.

7. A bidirectional flow switch comprising:
a housing defining a flow passage that is elongated in a first direction;
a magnetic sensor in a fixed position with respect to the flow passage;
a body disposed in the flow passage and that is movable with respect to the housing;
a magnet in a fixed position with respect to the body so that a movement of the body causes a movement of the magnet, wherein the movement of the magnet has a directional component in the first direction; and
an elastic member that biases the body towards a first position,
wherein the body and the housing are configured so that
a first threshold flow rate through the body in the first direction causes the magnet to move past a first displacement distance in the first direction, and
a second threshold flow rate through the body in a second direction that is opposite the first direction causes the magnet to move past a second displacement distance in the second direction, and
wherein the magnetic sensor is in a first state when the body is in the first position, and the magnetic sensor is in a second state that is different from the first state when the body is displaced past the first displacement distance in the first direction and when the body is displaced past the second displacement distance in the second direction.

8. The bidirectional flow switch of claim 7, wherein the body comprises a plug portion that directs at least a majority of flow between an exterior surface of the plug portion and an inner surface of the flow passage,
wherein the flow passage comprises a stepped-down portion that defines a portion of the flow passage with a cross sectional area transverse to the first direction that is less than a cross section of the flow passage on a first side in the first direction and a cross section of the flow passage on a second side in the second direction,
wherein the stepped-down portion is aligned with respect to the plug portion when the body is in the first position so that the plug portion is within the stepped-down portion, and
wherein a displacement of the plug portion past the stepped-down portion causes a greater flow area than when the plug portion is aligned with the stepped-down portion.

9. The bidirectional flow switch of claim 7, wherein the stepped-down portion is centered with respect to the fixed position of the magnetic sensor.

10. The bidirectional flow switch of claim 7, wherein the magnetic sensor is a reed switch.

11. The bidirectional flow switch of claim 7, wherein the magnetic sensor is a Hall Effect sensor.

12. The bidirectional flow switch of claim 7, wherein the elastic member comprises a pair of opposing compression springs.

13. A bidirectional flow switch comprising:
a housing defining a generally cylindrical flow passage between a first port and a second port so that the flow passage defines a first flow direction from the first port to the second port and a second flow direction from the second port to the first port;
a body that is movable with respect to the housing in the first flow direction and in the second flow direction, wherein the body comprises a solid portion across its interior so that fluid received by a respective end of the body from the first port or the second port flows about the solid portion and between an outer surface of the solid portion and an inner surface of the flow passage;
a stepped-down section within the generally cylindrical flow passage having a diameter smaller than a diameter of the flow passage at a first side of the stepped-down section and smaller than a diameter of the flow passage at a second side of the stepped-down section;
a magnetic sensor attached to the housing;
a magnet attached to the body; and
a pair of springs that bias the body towards a first position in which the magnet is aligned with the magnetic sensor and the stepped-down section in a direction transverse to the first flow direction;

wherein, when the body is in the first position, a distance is defined between the stepped-down section and an exterior of the body so that a first threshold flow rate through the housing in the first flow direction causes the magnet to move past a first displacement distance in the first flow direction, and so that a second threshold flow rate through the housing in the second flow direction causes the magnet to move past a second displacement distance in the second flow direction, and wherein the magnetic sensor is in a first state when the body is in the first position, and the magnetic sensor is in a second state that is different from the first state when the body is displaced past at least one of the first displacement distance in the first flow direction and the second displacement distance in the second flow direction.

14. The bidirectional flow switch of claim 13, wherein the magnetic sensor is a reed switch.

15. The bidirectional flow switch of claim 13, wherein the magnetic sensor is a Hall Effect sensor.

* * * * *